US008610325B2

(12) United States Patent
Chen

(10) Patent No.: US 8,610,325 B2
(45) Date of Patent: Dec. 17, 2013

(54) GENERATOR WITH NON-MAGNETIC ROTOR

(76) Inventor: Tai-Liang Chen, New Taipei (TW)

( * ) Notice: Subject to any disclaimer, the term of this patent is extended or adjusted under 35 U.S.C. 154(b) by 143 days.

(21) Appl. No.: 13/286,236

(22) Filed: Nov. 1, 2011

(65) Prior Publication Data

US 2012/0133228 A1 May 31, 2012

(30) Foreign Application Priority Data

Nov. 26, 2010 (TW) .............................. 99222987 U

(51) Int. Cl.
*H02K 21/26* (2006.01)

(52) U.S. Cl.
USPC ...................................... 310/154.01; 310/112

(58) Field of Classification Search
None
See application file for complete search history.

(56) References Cited

U.S. PATENT DOCUMENTS

| 3,549,923 | A | * | 12/1970 | Sergeevich et al. | ........... 310/162 |
| 3,558,941 | A | * | 1/1971 | Visconti Brebbia et al. | ........................ 310/49.15 |
| 3,602,749 | A | * | 8/1971 | Esters | ..................... 310/154.21 |

* cited by examiner

*Primary Examiner* — Thanh Lam
(74) *Attorney, Agent, or Firm* — Leong C. Lei

(57) ABSTRACT

The generator contains an outer casing, a non-magnetic rotor, an inner casing, outer stators, and inner stators. The non-magnetic rotor has an internal storage space, and is axially mounted on an axle and housed inside the outer casing with the axle rotatably supported by two ends of the outer casing. The outer stators are configured on an inner circumferential surface of the outer casing. Correspondingly, a number of coils are configured on an outer circumferential surface of the non-magnetic rotor. The inner casing is housed inside the storage space with the inner stators configured on an outer circumferential surface of the inner casing. The inner casing is rotatably configured on the axle by a number of bearings. The outer and inner stators are of reversed magnetic polarities so that, when the axle spins, the inner stators remain still due to the magnetic attraction from the outer stators.

2 Claims, 5 Drawing Sheets

GENERATOR WITH NON-MAGNETIC ROTOR

TECHNICAL FIELD OF THE INVENTION

The present invention is generally related to generators, and more particular to a generator having a non-magnetic rotor spin between the magnetic field between outer and inner stators.

DESCRIPTION OF THE PRIOR ART

Currently, the electricity with which people reply on with their daily lives are produced from sources such as solar light, wind power, hydraulic power, potential energy difference, thermal energy, nuclear power, etc. by various conversion means.

These conversion means generally involves a generator whose conversion efficiency is a key factor.

For most generators, the electricity is induced by cutting through magnetic field with coils. Therefore, the efficiency of the generator is significantly affected by the strength of the magnetic field, the number of coils, and the torque required.

Conventionally, the N->S or S->N magnetic flux of an ordinary generator runs from a stator of a polarity, through the rotor, and ends at another stator of opposite polarity Then coils cut through the magnetic flux to induce electricity. Since the magnetic flux passes through the rotor, the rotor's spin requires energy to counter the magnetic field. The greater the magnetic field, the more energy is required. As such, most of the existing generators are of limited efficiency due to the loss of energy.

SUMMARY OF THE INVENTION

Therefore, to obviate the shortcoming of the conventional generators, the present invention provides a generator whose rotor does not need to counter magnetic field and the generator is therefore able to achieve significantly improved efficiency.

A major objective of the present invention is to use a non-magnetic rotor to run through virtually static magnetic field established between pairs of outer and inner stators of opposite magnetic polarities.

To achieve the objective, the generator contains an outer casing, a non-magnetic rotor, an inner casing, outer stators, and inner stators. The non-magnetic rotor has an internal storage space, and is axially mounted on an axle and housed inside the outer casing with the axle rotatably supported by two ends of the outer casing. The outer stators are configured on an inner circumferential surface of the outer casing. Correspondingly, a number of coils are wound and configured on an outer circumferential surface of the non-magnetic rotor. The inner casing is housed inside the storage space of the non-magnetic rotor with the inner stators configured on an outer circumferential surface of the inner casing. The inner casing is rotatably configured on the axle by a number of bearings. The outer and inner stators are of reversed magnetic polarities so that, when the axle spins, the non-magnetic rotor turns as well yet the inner stators remain still due to the magnetic attraction from the outer stators.

Due to its significant improved efficiency, the present invention could be applied to transportation vehicles and the generator could function only by the movement of the vehicle under inertia. Then, under normal driving condition, the generator is able to provide more than sufficient electricity In addition to the vehicles, the significant improved efficiency of the present invention allows the generator to be widely applied to various occasions and thereby helps improving the challenging energy consumption problem that people face today.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
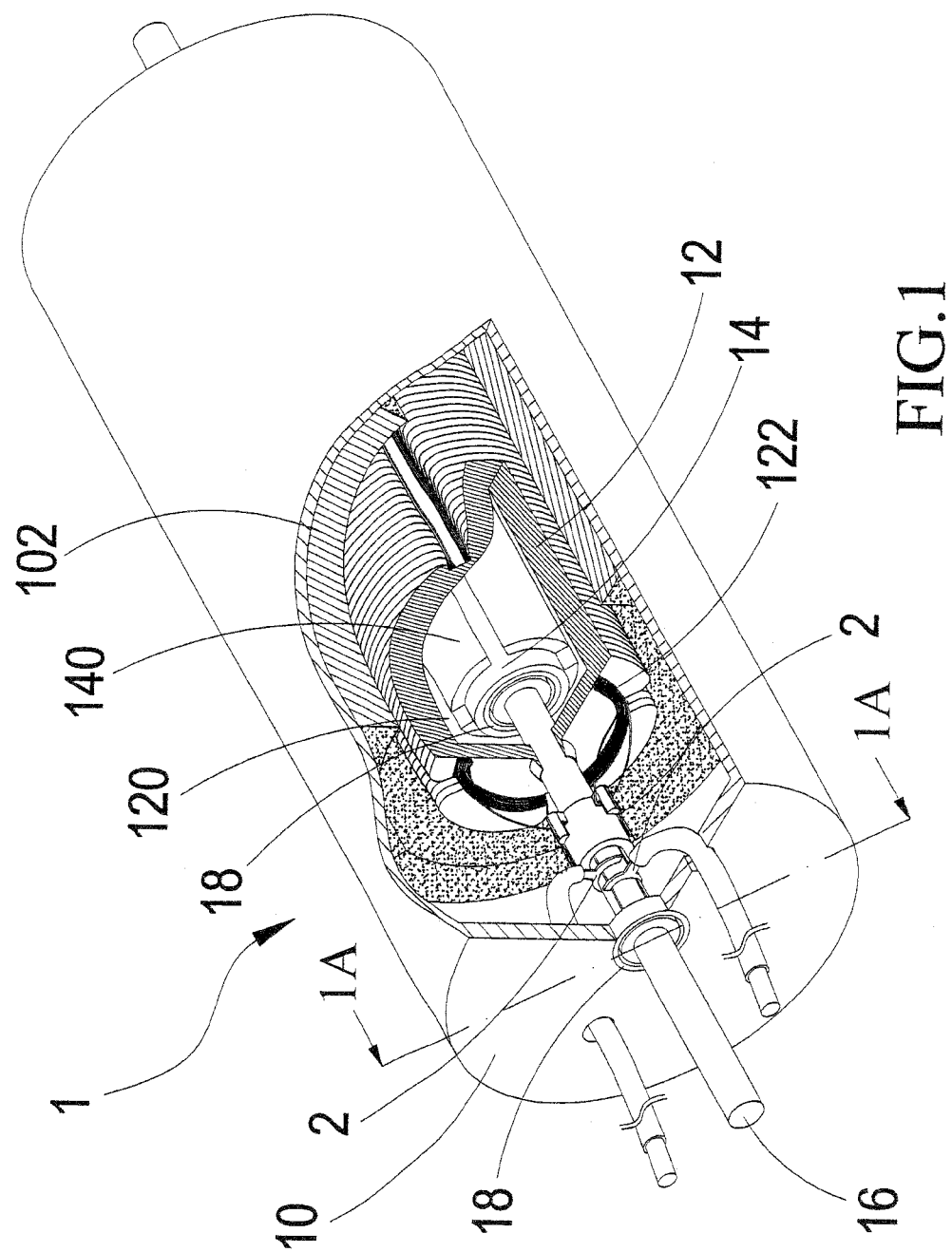
FIG. 1 is a perspective diagram showing the internals of a generator according to an embodiment of the present invention.
Figure 1A:
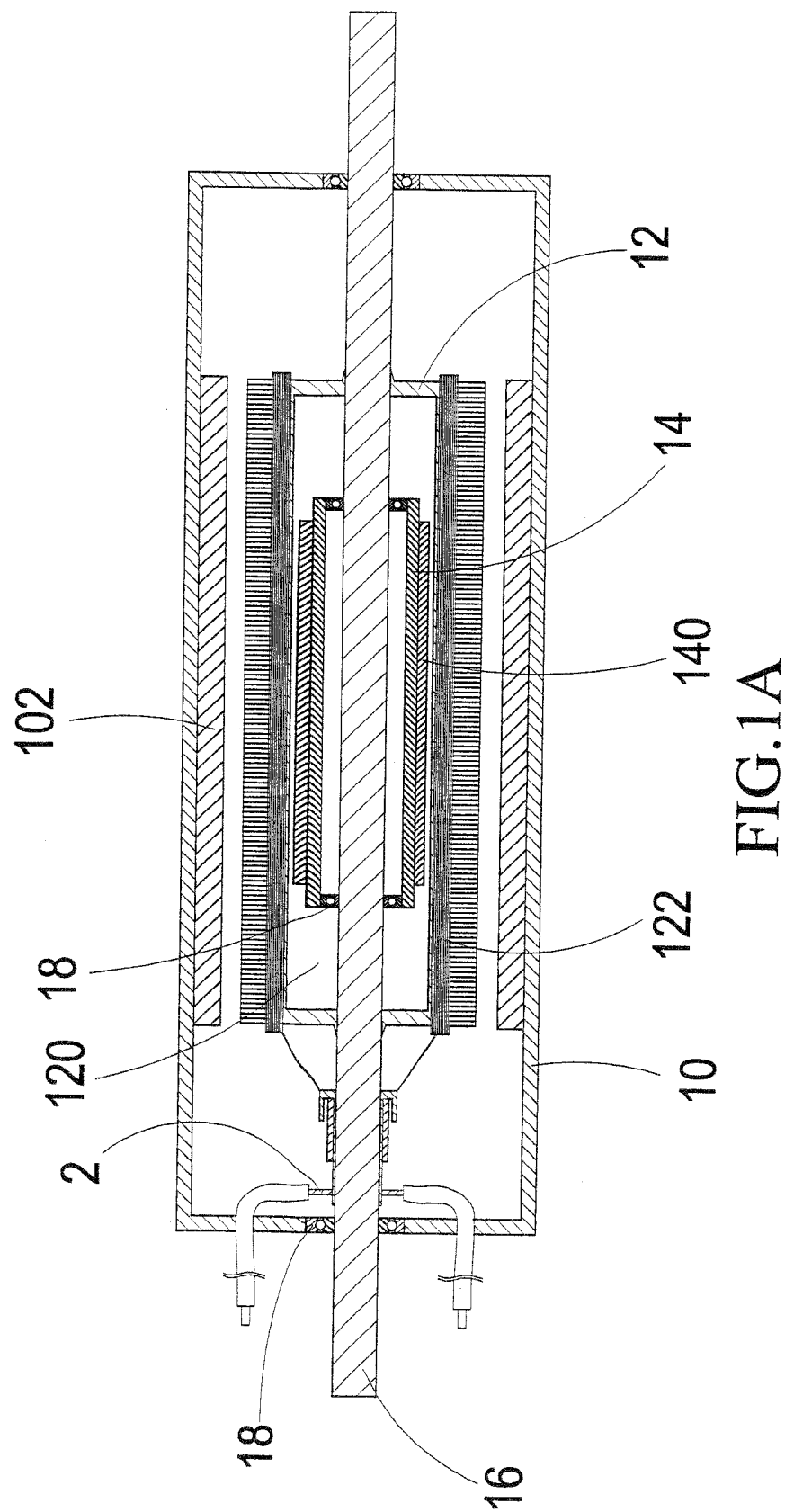
FIG. 1A is a cross-sectional diagram showing the generator as an A-A line of FIG. 1.

FIGS. 1 and 1A are perspective and cross-sectional diagrams showing a generator 1 according to an embodiment of the present invention. As illustrated, the generator 1 contains an outer casing 10, a non-magnetic rotor 12, an inner casing 14, outer stators 102, and inner stators 140. The non-magnetic rotor 12 has an inner storage space 120 and is axially mounted on an axle 16. The non-magnetic rotor 12 is housed inside the outer casing 10 with the axle 16 rotatably supported by two ends of the outer casing 10. The outer stators 102 are configured on an inner circumferential surface of the outer casing 10, surrounding the non-magnetic rotor 12. Correspondingly to the outer stators 102, a number of coils 122 are wound and positioned on an outer circumferential surface of the non-magnetic rotor 12. The inner casing 14 is housed inside the storage space 120 of the non-magnetic rotor 12. The inner stators 140 are configured on an outer circumferential surface of the inner casing 14. At specific places inside the inner casing 14, a number of bearings 18 are rotatably configured on the axle 16. The outer and inner stators 102 and 140 are of reversed magnetic polarities so that, when the axle 16 spins, the non-magnetic rotor 12 turns as well yet the inner stators 140 remain still due to the magnetic attraction from the outer stators 102. As such, the coils 122 continuously cut through the magnetic flux between the outer and inner stators 102 and 140 and thereby produce electricity which is extracted by a number of carbon brushes 2 contacting the axle 16.

Figure 2:
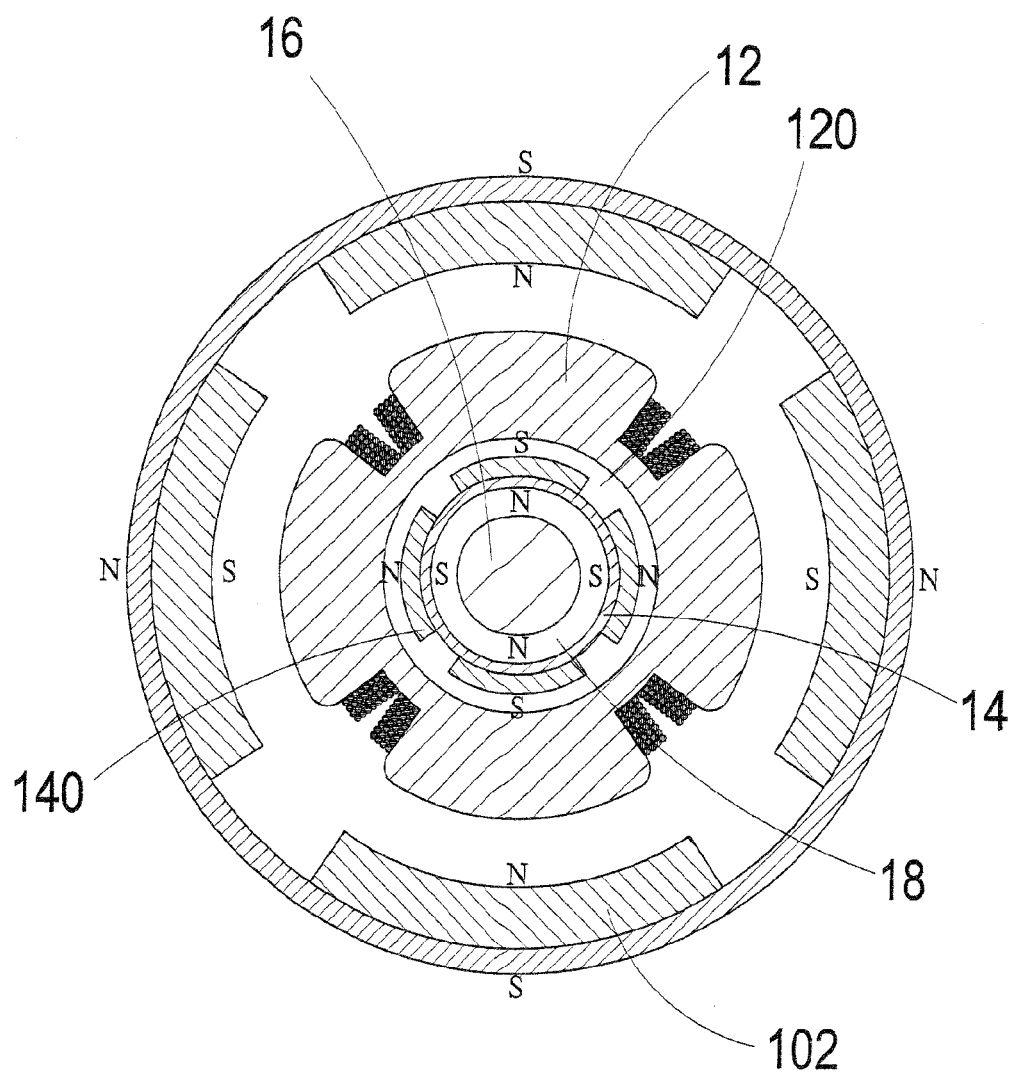
FIG. 2 is a sectional diagram showing the generator 1 of FIG. 1.
Figure 3:
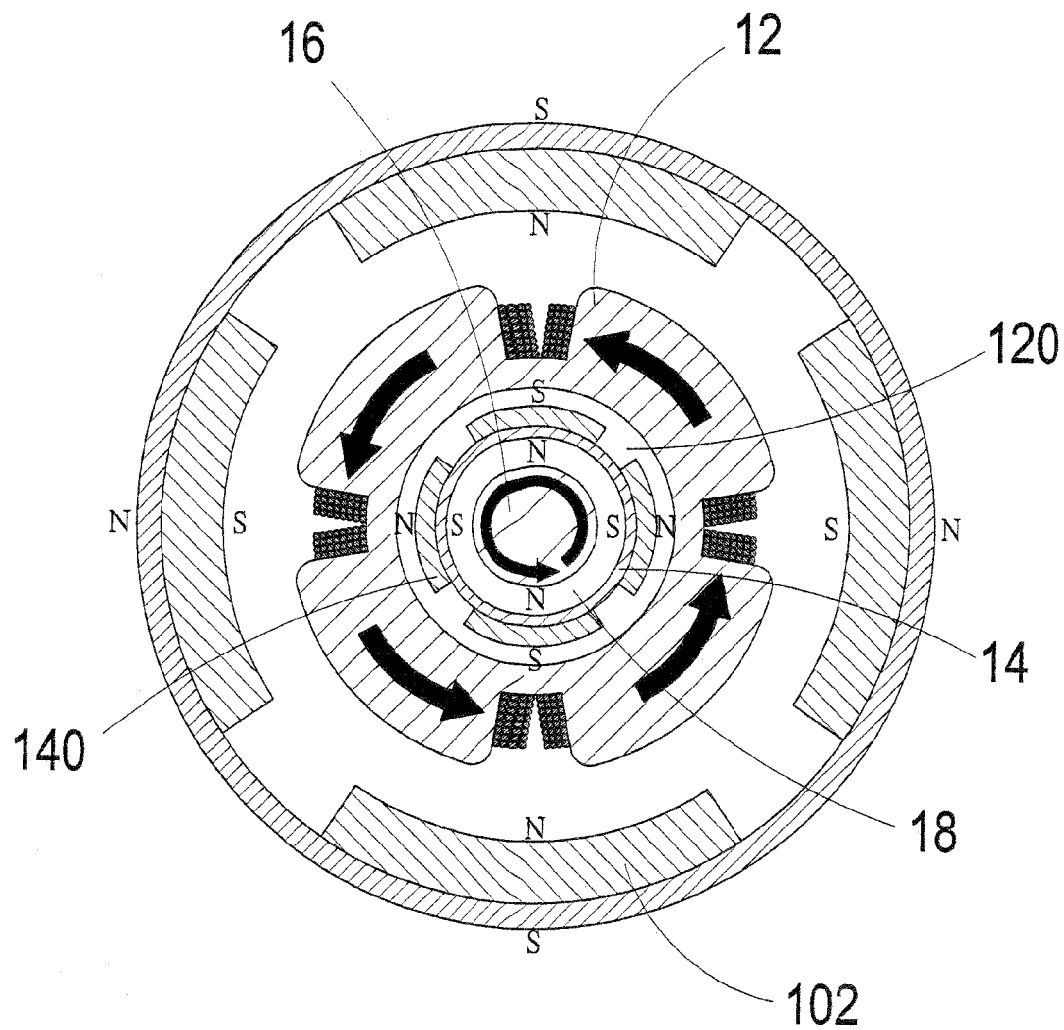
FIG. 3 is a sectional diagram showing a scenario of the generator of FIG. 1.
Figure 4:
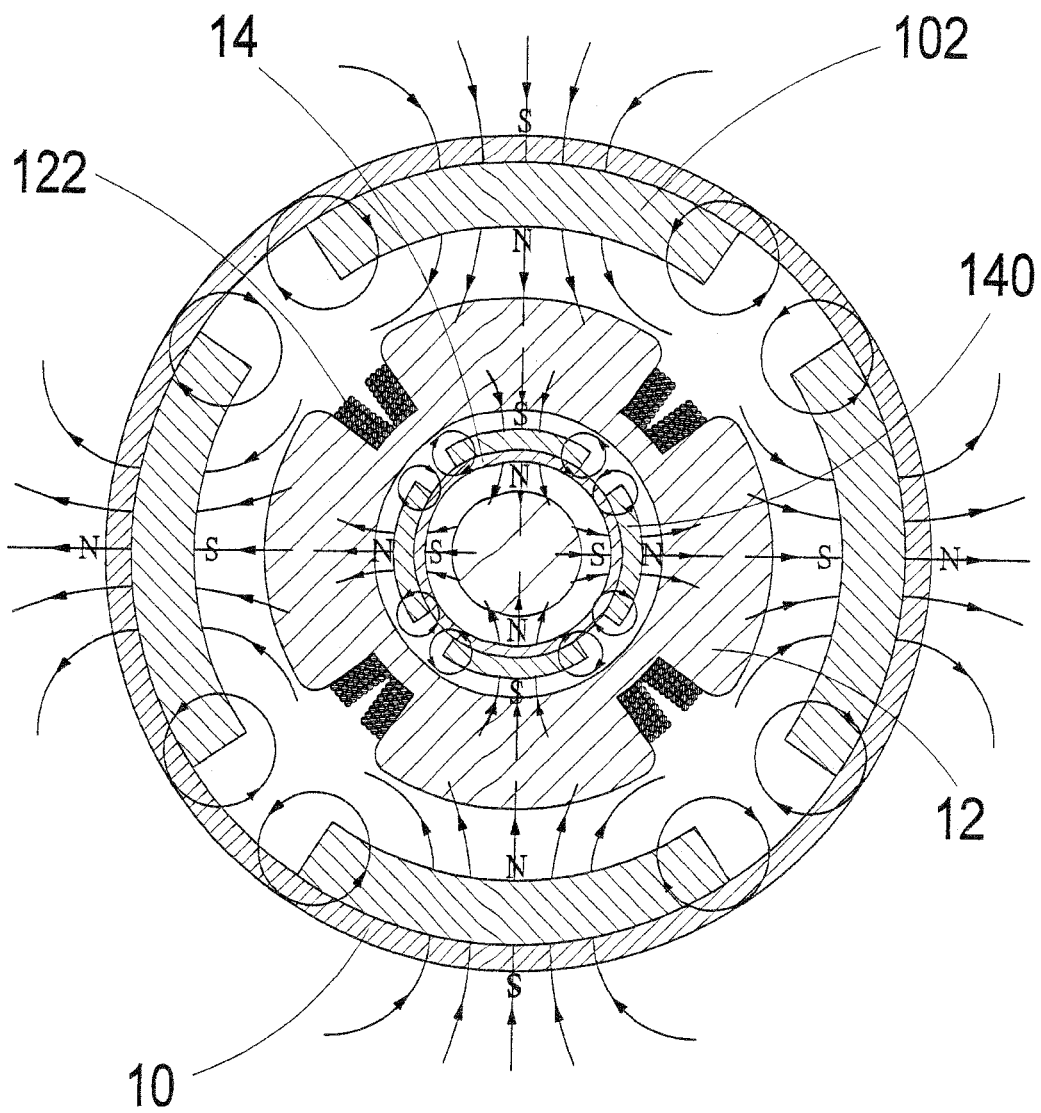
FIG. 4 is a sectional diagram showing the magnetic flux of the generator 1 of FIG. 1.

The operation of the generator is as follows. As illustrated by FIGS. 2 to 4, which are sectional diagrams showing the generator 1, the inner casing 14 is rotatably mounted on the axle 16 by the bearings 18 as the inner sides of the bearings 18 are fixedly attached to the outer circumferential surface of the axle 16 and the outer sides of the bearings 18 are fixedly attached to the inner casing 14. As the axle 16 spins, the non-magnetic rotor 12 spins along with the axle 16, and the inner casing 14 remains still due to the attraction between the outer and inner stators 102 and 140.

Strong magnetic flux is established between the outer and inner stators 102 and 140. Then, as the coils 122 cut through the magnetic flux, enhanced efficiency is achieved since the coils 122 do not need to fight against the magnetic attraction.

From the magnetic flux distribution shown in FIG. 4, the non-magnetic rotor 12 will not suffer any repelling and the non-magnetic rotor 12 is able to rotate with reduced torque, thereby producing greater energy While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A generator, comprising:
   an outer casing having a plurality of outer stators configured on an inner circumferential surface of said outer casing;
   a non-magnetic rotor having an internal storage space and a plurality of coils wound and configured on an outer circumferential surface of said non-magnetic rotor corresponding to said outer stators, said non-magnetic rotor axially mounted on an axle, said axle rotatably supported by two ends of said outer casing;
   an inner casing housed in said storage space rotatably mounted on said axle by a plurality of bearings configured at specific places between said axle and said inner casing; and
   a plurality of inner stators configured on an outer circumferential surface of said inner casing corresponding to said outer stators;
   wherein said outer and inner stators are of opposite magnetic polarities and magnetic attraction is present between corresponding outer and inner stators.

2. The generator according to claim 1, further comprising a plurality of carbon brushes contacting said axle.

* * * * *